United States Patent
Sturmat et al.

(10) Patent No.: US 9,721,537 B2
(45) Date of Patent: Aug. 1, 2017

(54) MOTOR VEHICLE DISPLAY DEVICE

(71) Applicant: Volkswagen AG, Wolfsburg (DE)

(72) Inventors: Sandra Sturmat, Braunschweig (DE); Roman Gabbert, Magdeburg (DE); Christoph Krawczyk, Bokensdorf (DE); Janine Bretz, Bokensdorf (DE)

(73) Assignee: Volkswagen AG, Wolfsburg (DE)

( * ) Notice: Subject to any disclaimer, the term of this patent is extended or adjusted under 35 U.S.C. 154(b) by 158 days.

(21) Appl. No.: 13/925,012

(22) Filed: Jun. 24, 2013

(65) Prior Publication Data
US 2013/0293445 A1 Nov. 7, 2013

Related U.S. Application Data

(63) Continuation of application No. PCT/EP2011/006014, filed on Dec. 1, 2011.

(30) Foreign Application Priority Data

Dec. 24, 2010 (DE) .......................... 10 2010 056 282

(51) Int. Cl.
*G09G 5/377* (2006.01)
*B60K 37/02* (2006.01)
*G01D 13/02* (2006.01)

(52) U.S. Cl.
CPC ............. *G09G 5/377* (2013.01); *B60K 37/02* (2013.01); *G01D 13/02* (2013.01); *B60K 2350/1064* (2013.01); *B60K 2350/1072* (2013.01); *B60K 2350/2017* (2013.01); *B60K 2350/2082* (2013.01); *B60K 2350/2091* (2013.01); *B60K 2350/402* (2013.01); *B60Y 2410/122* (2013.01); *B60Y 2410/125* (2013.01)

(58) Field of Classification Search
CPC .............. G09G 5/377; F21K 9/30; F21K 9/50
USPC ............................................................ 345/4
See application file for complete search history.

(56) References Cited

U.S. PATENT DOCUMENTS 4,939,934 A * 7/1990 Ritzenthaler et al. .......... 73/431
7,121,674 B2 10/2006 Kraus et al.
(Continued)

FOREIGN PATENT DOCUMENTS

DE 198 16 018 A1 10/1999
DE 199 04 597 A1 10/1999
(Continued)

*Primary Examiner* — Alexander Eisen
*Assistant Examiner* — Kebede Teshome
(74) *Attorney, Agent, or Firm* — Muncy, Geissler, Olds & Lowe, P.C.

(57) ABSTRACT

A motor vehicle display device is provided with information on vehicle operating states which can be displayed in an analog and/or digital manner by display elements, wherein in the direction of viewing of the motor vehicle display device, the display elements are disposed at least in two superimposed planes or plane regions. At least one first plane or one first plane region is provided, in which at least one active display element is disposed, and at least one further plane or one further plane region is provided, which is positioned before the first plane or the first plane region in a viewing direction, wherein only passive display elements are disposed therein, with at least one passive display element being disposed there. In this way the motor vehicle display device is given an appearance with a special 3D effect.

10 Claims, 2 Drawing Sheets

(56) References Cited

U.S. PATENT DOCUMENTS

| | | |
|---|---|---|
| 7,347,574 B2 | 3/2008 | Kraus |
| 7,494,256 B1 | 2/2009 | Kelman et al. |
| 7,654,679 B2 | 2/2010 | Mezouari |
| 7,702,434 B2 | 4/2010 | Dupont et al. |
| 2003/0116079 A1* | 6/2003 | Sugiyama et al. ............ 116/305 |
| 2003/0221606 A1* | 12/2003 | Quigley et al. ............... 116/286 |
| 2004/0085746 A1 | 5/2004 | Chen |
| 2004/0129197 A1* | 7/2004 | Nakagawa et al. ......... 116/28 R |
| 2005/0078485 A1* | 4/2005 | Kraus et al. .................. 362/489 |
| 2005/0128733 A1 | 6/2005 | Clugston et al. |
| 2006/0212162 A1* | 9/2006 | Kato ............................ 700/213 |
| 2006/0256545 A1* | 11/2006 | Wang et al. .................... 362/23 |
| 2007/0290959 A1* | 12/2007 | Kim ................................ 345/82 |

FOREIGN PATENT DOCUMENTS

| | | |
|---|---|---|
| DE | 101 53 100 A1 | 5/2003 |
| DE | 10 2004 038 916 A1 | 3/2005 |
| DE | 10 2004 0049 857 A1 | 5/2005 |
| DE | 199 06 129 B4 | 4/2006 |
| DE | 10 2006 026 355 A1 | 12/2006 |
| DE | 10 2008 000 766 A1 | 12/2008 |
| WO | WO 2008/092578 A1 | 8/2008 |

\* cited by examiner

MOTOR VEHICLE DISPLAY DEVICE

This nonprovisional application is a continuation of International Application No. PCT/EP2011/006014, which was filed on Dec. 1, 2011, and which claims priority to German Patent Application No. DE 10 2010 056 282.3, which was filed in Germany on Dec. 24, 2010, and which are both herein incorporated by reference.

BACKGROUND OF THE INVENTION

Field of the Invention

The present invention relates to a motor vehicle display device having information on vehicle operating states which may be displayed by display elements in an analog and/or digital manner, wherein the display elements are disposed on at least two superimposed planes or plane regions in the direction of viewing of the motor vehicle display device.

Description of the Background Art

Motor vehicle display units of this type are known, for example from WO 2008/092578 A1, US 2005/0128733 A1 and DE 10 2004 049 857 A1, which corresponds to U.S. Pat. No. 7,121,674. A three-dimensional appearance of the display is achieved by disposing the display elements on superimposed planes or on plane regions.

Since motor vehicle display devices may represent central elements in the region of the instrument panel of a motor vehicle which must meet the strictest design requirements in addition to functional aspects, it is desirable to refine known design effects or provide alternative means with the aid of which such effects may be achieved.

SUMMARY OF THE INVENTION

It is therefore an object of the present invention to provide an alternative motor vehicle display device by means of which the displays of a motor vehicle display device may be given a three-dimensional appearance.

In an embodiment, a motor vehicle display device can include information on vehicle operating states (such as driving speed or motor speed) which may be displayed by display elements in an analog and/or digital manner, wherein the display elements are disposed on at least two superimposed planes or plane regions in a direction of viewing of the motor vehicle display device.

According to an embodiment of the invention, at least one plane or one first plane region can be provided, in which at least one active display element is disposed, and at least one additional plane or one additional plane region is provided, which is positioned in front of the first plane or the first plane region in the direction of viewing, only passive display elements being disposed therein, however at least one passive display element being disposed therein.

A special 3D effect may be achieved due to this measure. The passive display elements seem to literally float within the motor vehicle display device.

The motor vehicle display device may be, in particular, a so-called instrument cluster, although other motor vehicle display devices are conceivable, in particular in the region of the instrument panel.

An active display element can be understood to be an element which is variable within the motor vehicle display device and which changes its position, size and/or shape and thus adapts to a particular vehicle operating state to be displayed. This element may be, for example, an analog instrument pointer of a speedometer or a tachometer. Of course, it may likewise be a digitally displayed instrument pointer on a corresponding (freely programmable) display.

Conversely, a passive display element can be understood to be an element whose position, size and shape does not change within the motor vehicle display unit. This element may be, for example, a tick mark of a gauge, a level of speed or the number determining the rotational speed or only a symbol.

According to an embodiment of the invention, it is proposed that the display elements provided on the first plane or in the first plane region include at least one analog display element and at least one display element which may be digitally displayed on a display. The connection between analog display elements and digitally displayable display elements (preferably via a freely programmable display) greatly increases the flexibility of the display.

It may be advantageously provided that the display elements provided on the first plane or in the first plane region and on the second plane or in the second plane region are disposed in the manner of a two-eye instrument cluster, a portion of multiple passive display elements provided on the second plane or in the second plane region each being assigned to or superimposed by the at least one analog display element and the at least one digitally displayable display element.

In this manner, a very elegant display may be implemented for an instrument cluster having a "two-eye" design, for example having a speed indicator designed as a round instrument (speedometer, left "eye") and a tachometer, which is also designed as a round instrument (right "eye"). This measure may also be used to mitigate the (undesirable, among other things) "design flaw" caused by combining analog and digital display technologies.

It is advantageous if at least one component having at least two light-conducting bodies is provided on the second plane or in the second plane region, at least one passive display element being disposed between the bodies and a partition region being provided at least in sections between the bodies which runs at an angle to the surface extension of at least one of the bodies, and at least one passive element being disposed on the plane of the partition region or approximately parallel thereto. This makes it possible to achieve a very special three-dimensional effect, since it is thus possible to allow the passive display elements to appear to be floating at an angle in space. For example this can be used to position tick marks of a gauge accordingly in space.

It is very suitable and advantageous for manufacturing if at least one of the bodies has a plate-shaped design and has at least one indentation or one opening into which the other body is at least partially inserted.

In particular, the component may have at least two indentations or openings into which the one other body is at least partially inserted. In addition, passive display elements may be disposed between the bodies and form part of an instrument gauge. For example, this makes it possible to implement a highly attractive gauge for an instrument cluster having a tried-and-trusted "two-eye" design.

If the component is surrounded by an annular light conductor into which light may be coupled with the aid of at least one illuminant, the at least one passive display element being used to couple out the light, a very uniform light coupling into the component or a very good illumination of the passive display elements introduced into the component (such as the tick marks of a gauge) may be achieved hereby.

It is furthermore advantageous if the light conductor is provided with four light coupling points, each light coupling point being disposed on the end of a ramp-light thickened region of the light conductor. This contributes to a highly efficient light coupling into the light conductor which makes do with comparatively few illuminants. For example, LED may be considered as suitable illuminants.

The light coupling points may be disposed on the component in a region between the instrument gauges, viewed from above. This contributes to a uniform illumination of the two instrument gauges of an instrument cluster having a "two-eye" design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
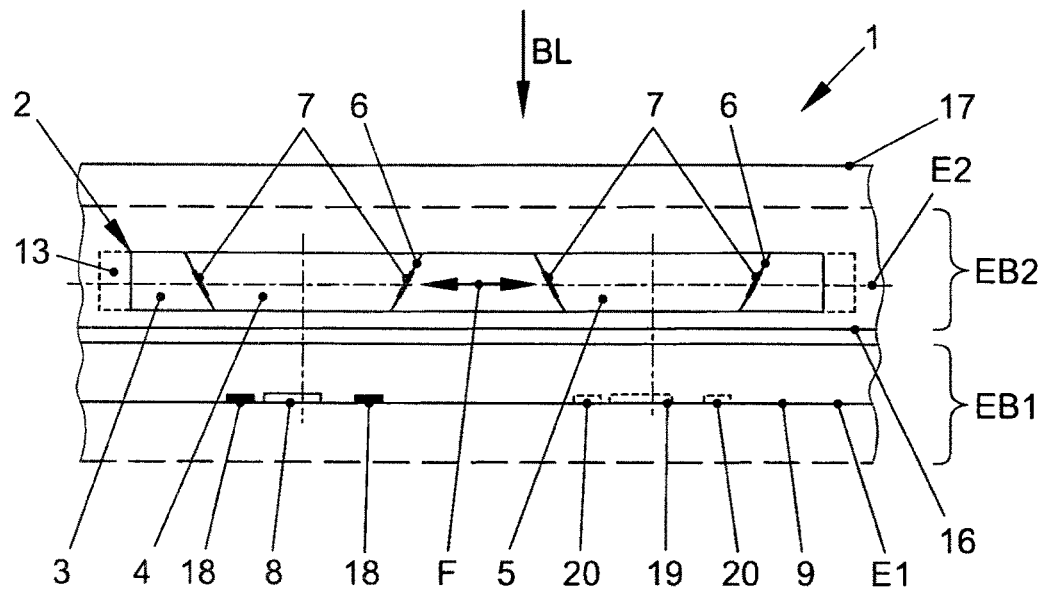
FIG. 1 shows a schematic representation of a display device according to an embodiment of the invention, whereby a plate-shaped component having passive design elements is used.

Reference is first made to FIG. 1. This figure shows a schematic representation of an instrument cluster 1 according to the invention, in which a plate-shaped component 2 is installed. Component 2 comprises a plate-shaped, light-conducting body 3, into which two likewise light-conducting, conical bodies 4 and 5 are inserted. Bodies 3, 4 and 5 can be made of, for example, polymethyl methacrylate (PMMA).

Figure 3:
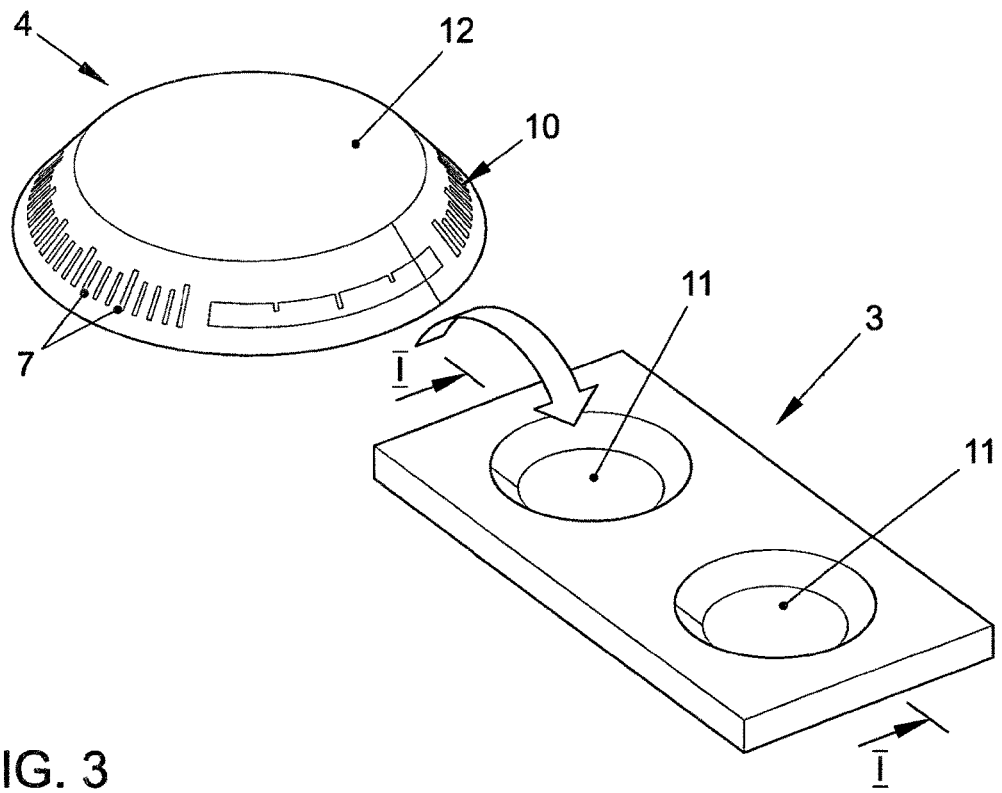
FIG. 3 shows a perspective representation of the plate-shaped component illustrated in FIG. 1, which comprises multiple light-conducting bodies, prior to assembly.

A circumferential, conical partition region 6 is provided between light-conducting bodies 3 and 4 and 3 and 5, respectively (also see FIG. 3 relating to the aforementioned discussion).

In FIG. 1, which illustrates component 2 or 3 according to the sectional view in FIG. 3, partition regions 6 are shown as dotted lines running at an angle in relation to a surface extension F of component 3. Passive elements 7 within partition regions 6 are indicated by slightly thicker lines. Display elements 7 are disposed on a plane E2 or within a plane region EB2.

As shown in FIG. 3, the passive display elements may be designed in the form of tick marks of a gauge 10.

FIG. 1 also shows that, in a direction of viewing BL, component 2 is located on instrument cluster 1 on plane E2 or within plane region EB2 of the instrument cluster, which is located in front of a first plane E1 or in front of a first plane region EB1, on/in which the active display elements are situated.

As active display elements, an analog instrument pointer 8 (speedometer needle) having analog, displayed numbers 18 is shown on the left side of instrument cluster 1, and a digitally displayable instrument pointer 19 on a freely programmable display 9 is shown on the right side. Display 9 is used for the digital display of instrument pointer 19 and numbers 20 of a tachometer. In addition to the displays, additional displays may be displayed depending on the situation, or the displayed information may be changed depending on the situation. For example, the thickness and color of the pointer may also change as the speed changes.

It is also conceivable to assign numbers 20, which may be displayed as a function of a selectable driving mode, to (invariable) tick marks 7, 7' located on freely programmable display 9 or to gauge 10 located on this display 9. In an "efficiency mode", for example, the entire gauge 10 could include a different (smaller) speed range than for a "sports mode." Accordingly, this would be conceivable for a speed display in which gauge 10 would include, for example, only a range from 0-160 km/h in "efficiency mode," while gauge 10 could be assigned a range from 0-240 km/h in a "sports mode," using (variable) numbers 20.

Furthermore, a black translucent film 16 is introduced above first plane E1 or plane region EB1, which thus represents the "active" display plane. This translucent film 16 results in the fact that, when the vehicle is turned off, active display plane E1 remains invisible to a viewer and only if instrument pointer 8, for example, is illuminated and if instrument pointer 19 is actively displayed do these elements become visible.

A transparent cover 17 is furthermore provided above second plane E2, which represents a passive display plane. However, a cover 17 of this type is not absolutely necessary, and it is unnecessary if component 2 comprising light-conducting bodies 3, 4 and 5 itself already has an antiglare design.

Based on the only schematic representation, necessary fastening elements, for example, for fastening component 2 within instrument cluster 1 are not illustrated.

Returning to FIG. 3, a possible method for manufacturing component 2 will now be described.

Light-conducting body 3 is first milled from the PMMA material, plate-shaped body 3 having two circular, conical indentations 11. The indentations thus have a plate-shaped appearance, the edges of the plate being part of partition regions 6 being formed (see FIG. 1).

Instead of plate-shaped indentations 11, through-openings may also be created, if necessary.

As the next step, a light-conducting, conical body 4 or 5 (not illustrated) is also turned from PMMA for each of recesses 11.

This is followed by the manufacture of a ring from white PMMA (also not illustrated). Each of these rings is glued without air bubbles onto the inclined surface of conical body 4 and 5, using a suitable adhesive.

In another step, the white ring is milled to the extent that raised, passive display elements in the form of gauge marks 7 remain, and a circumferential gauge 10 results.

The two bodies 4 and 5 are now glued to body 3, also in an essentially bubble-free manner (see arrow for body 4 in FIG. 3).

In another step, produced (unfinished) component 2 is milled from both sides (i.e., the visible side and the opposite side) until two essentially flat surfaces result. Finally, the edge sides are milled until a desired oval contour of component 2 results (also see FIG. 4).

It should be noted that component 2 may naturally also be manufactured using other suitable manufacturing processes or it may be made of other suitable materials. For example, casting from polyurethane resins (PU resins) in multiple steps is also possible, e.g., casting of clear PU in a first step and casting of white-dyed, translucent PU in a second step.

Manufacturing in an injection molding process would be particularly suitable for series production.

Figure 4:
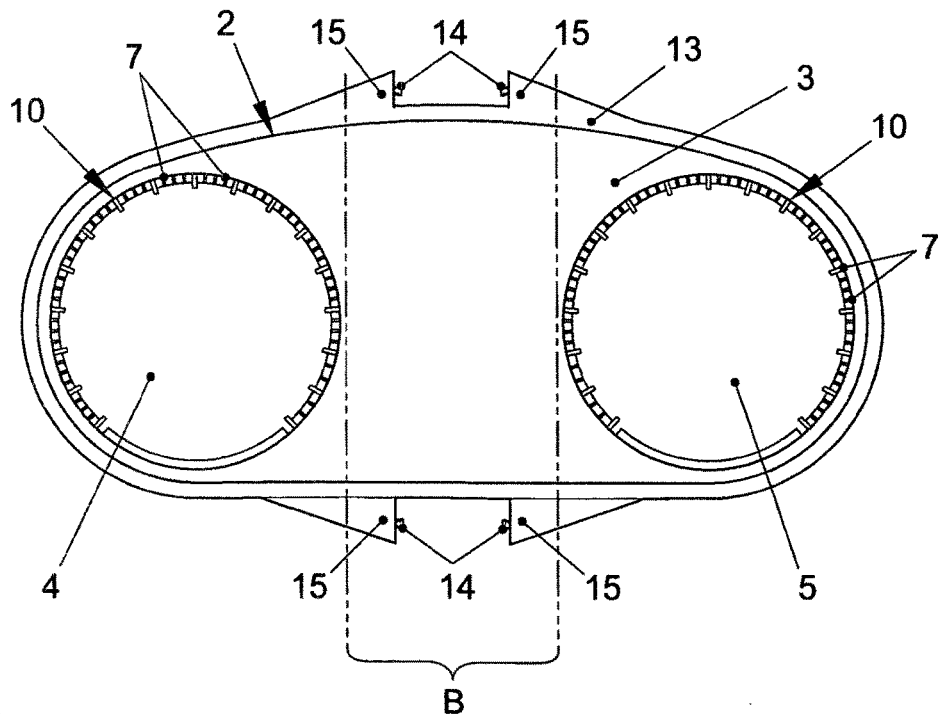
FIG. 4 shows a representation of a further processed component according to FIG. 3, viewed from above, whereby an annular light conductor used for illumination is additionally represented.

FIG. 4 now shows that an annular light conductor 13 disposed around body 3 is provided to illuminate or couple light into component 2 comprising bodies 3, 4 and 5. Four LEDs 14 are provided for coupling light into light conductor 13. It is apparent that the coupling points are each located on the end of ramp-like thickened areas 15 of light conductor 13. It is furthermore apparent that the light coupling points or LEDs 14 are disposed on component 2 or 3 in a region B between instrument gauges 10, viewed from above.

If light is now coupled into light conductor 13 with the aid of LEDs 14, this light also enters light-conducting bodies 3, 4 and 5, whereby tick marks 7, 7' or gauges 10 are caused to light up. In this manner, a very special 3D effect is produced, gauges 10 appearing to literally float above instrument pointers 8 or 19.

Annular light conductor 13 disposed around component 2 is indicated by a dashed line in FIG. 1.

Figure 2:
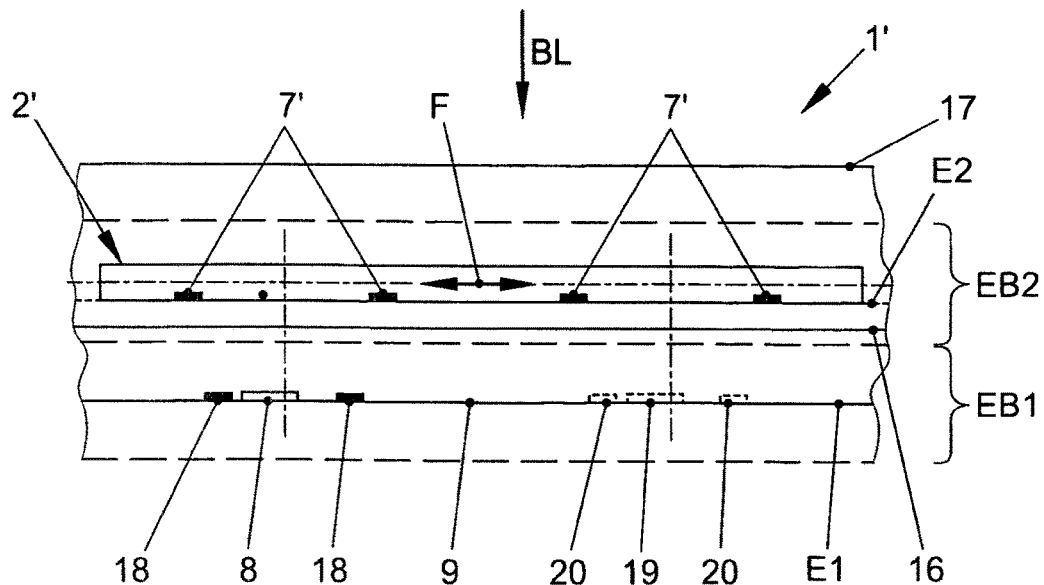
FIG. 2 shows a representation of a display device according to an embodiment of the invention, whereby a plate-shaped component having passive design elements also is used.

Finally, FIG. 2 is explained, which shows a modification of instrument cluster 1 according to the invention, as shown in FIG. 1.

In FIG. 2, an instrument cluster 1' is configured using comparable "plane technology." In contrast to FIG. 1, however, a plate-shaped component 2' (also made of PMMA) is used which has passive display elements 7' in the form of tick marks, which are oriented approximately parallel to surface extension F of component 2'.

Display elements 7 can be printed onto, milled or cast into component 2'. However, they may be also mounted or introduced in other ways.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle display device comprising:
   display elements configured to display information with respect to vehicle operating states, the information being displayed in an analog and/or digital manner, the display elements being disposed on at least one first plane and at least one second plane, or at least one first plane region and at least one second plane region, that are superimposed in a viewing direction of the motor vehicle display device, the at least one second plane or the at least one second plane region being disposed closer to a viewer than the at least one first plane or the at least one first plane region,
   wherein the at least one first plane or the at least one first plane region includes at least one active display element,
   wherein the at least one second plane or the at least one second plane region includes at least one passive display element, the at least one passive display element being formed in a ring shape in a plan view defined by an outer diameter edge and an inner diameter edge, and
   wherein when viewed in the viewing direction, the at least one active display element in the at least one first plane or at least one first plane region is disposed inside the inner diameter edge of the at least one passive display element in the at least one second plane or at least one second plane region, thereby allowing the viewer to view a content in the at least one active display element through a space surrounded by the inner diameter edge of the at least one passive display element.

2. The motor vehicle display device according to claim 1, wherein the display elements disposed on the first plane or in the first plane region include at least one analog display element and at least one display element that are digitally displayed on a display.

3. The motor vehicle display device according to claim 2, wherein the display elements provided on the first plane or in the first plane region and on the second plane or in the second plane region are disposed in the manner of a two-eye instrument cluster, and wherein the at least one analog display element and the at least one digitally displayable display element are assigned one part of multiple passive display elements that are provided on the second plane or in the second plane region.

4. The motor vehicle display device according to claim 1, further comprising at least one component that has at least two light-conducting bodies and is provided on the second plane or in the second plane region, wherein at least one passive display element is disposed between the bodies, wherein a partition region is provided at least in sections between the bodies that run at an angle in relation to a surface extension of at least one of the bodies, and wherein the at least one passive display element is disposed on a plane of the partition region or approximately parallel thereto.

5. The motor vehicle display device according to claim 4, wherein at least one of the bodies has a plate-shaped design and has at least one indentation or one opening into which the other body is at least partially inserted.

6. The motor vehicle display device according to claim 4, wherein the component is surrounded by an annular light conductor into which light is coupled via at least one illuminant, and wherein the at least one passive display element is configured for coupling out the light.

7. The motor vehicle display device according to claim 4, wherein the component has at least two indentations or openings, into each of which another body is at least partially inserted, and wherein passive display elements are disposed between the bodies and are part of an instrument gauge.

8. The motor vehicle display device according to claim 6, wherein the light conductor is provided with four light coupling points, each light coupling point being disposed on an end of a ramp-like thickened area of the light conductor.

9. The motor vehicle display device according to claim 8, wherein the light coupling points are disposed on the component in a region between the instrument gauges viewed from above.

10. The motor vehicle display device according to claim 1, further comprising a black translucent film disposed between the passive display elements or the at least one passive display element, and the at least one active display element.

* * * * *